(12) United States Patent
Kiani

(10) Patent No.: US 7,990,382 B2
(45) Date of Patent: Aug. 2, 2011

(54) VIRTUAL DISPLAY

(75) Inventor: Massi E. Kiani, Laguna Niguel, CA (US)

(73) Assignee: Masimo Corporation, Irvine, CA (US)

( * ) Notice: Subject to any disclaimer, the term of this patent is extended or adjusted under 35 U.S.C. 154(b) by 454 days.

(21) Appl. No.: 11/648,972

(22) Filed: Jan. 3, 2007

(65) Prior Publication Data

US 2007/0188495 A1 Aug. 16, 2007

Related U.S. Application Data

(60) Provisional application No. 60/755,899, filed on Jan. 3, 2006.

(51) Int. Cl.
*G06T 17/00* (2006.01)

(52) U.S. Cl. ........ 345/440; 345/582; 345/619; 345/629; 345/689; 345/699

(58) Field of Classification Search .............. None
See application file for complete search history.

(56) References Cited

U.S. PATENT DOCUMENTS

| | | |
|---|---|---|
| 3,463,142 A | 8/1969 | Harte et al. |
| 3,647,299 A | 3/1972 | Lavallee |
| 3,740,570 A | 6/1973 | Kaelin et al. |
| 3,799,672 A | 3/1974 | Vurek |
| 4,051,522 A | 9/1977 | Healy et al. |
| 4,086,915 A | 5/1978 | Kofsky et al. |
| 4,169,976 A | 10/1979 | Cirri |
| 4,182,977 A | 1/1980 | Stricklin, Jr. |
| 4,216,462 A | 8/1980 | McGrath et al. |
| 4,237,344 A | 12/1980 | Moore |
| 4,308,456 A | 12/1981 | van Der Gaag et al. |
| 4,346,590 A | 8/1982 | Brown |
| 4,356,475 A | 10/1982 | Neumann et al. |
| 4,407,290 A | 10/1983 | Wilber |
| 4,449,821 A | 5/1984 | Lee |
| 4,480,886 A | 11/1984 | Bergamin |
| 4,580,867 A | 4/1986 | Wright et al. |
| 4,621,643 A | 11/1986 | New, Jr. et al. |
| 4,653,498 A | 3/1987 | New, Jr. et al. |
| 4,674,085 A | 6/1987 | Aranguren et al. |
| 4,700,708 A | 10/1987 | New, Jr. et al. |

(Continued)

FOREIGN PATENT DOCUMENTS

DE 19531520 1/1997

(Continued)

OTHER PUBLICATIONS

De Kock, J.P. et al., "The Effect of Varying LED Intensity on Pulse Oximeter Accuracy", Journal of Medical Engineering & Technology, vol. 15, No. 3, May/Jun. 1991, pp. 111-116.
http://www.masimo.com/adt.htm, "Inop adt—Adult Disposable Digit Sensor," 1 page, reviewed on Sep. 17, 1999.
http://www.masimo.com/cables.htm, "Patient Cables", 1 page, reviewed on Sep. 17, 1999.
http://www.masimo.com/pndt.htm, "Products & Technology", 1 page, reviewed on Sep. 17, 1999.
http://www.masimo.com/systemo.htm, "System Overview & Performance", 2 pages, reviewed on Sep. 17, 1999.
http://www.mrequipment.com/products/oximetry_patient_mntrg.htm, "MR Equipment Magnetic Resonance Equipment Corporation, MR-Compatible High-Performance Optical Fiber Sensors, Pulse Oximetry Sensors for MRI Fiber Optic Sensors for use with MR-Compatible Pulse Oximeter", 2 pages, reviewed on Sep. 17, 1999.

(Continued)

*Primary Examiner* — Kee M Tung
*Assistant Examiner* — Jwalant Amin
(74) *Attorney, Agent, or Firm* — Knobbe Martens Olson & Bear, LLP

(57) ABSTRACT

Display objects are defined that are capable of visually indicating physiological measurements and physiological monitor status. A virtual display utilizing these display objects is characterized by selecting those display objects corresponding to one or more particular physiological parameters, organizing the selected display objects within a virtual display area corresponding to at least a portion of a physical display, and associating data objects corresponding to the one or more physiological parameters with the selected display objects.

22 Claims, 5 Drawing Sheets

U.S. PATENT DOCUMENTS

| | | | |
|---|---|---|---|
| 4,770,179 A | 9/1988 | New, Jr. et al. | |
| 4,848,901 A | 7/1989 | Hood, Jr. | |
| 4,865,038 A | 9/1989 | Rich et al. | |
| 4,877,322 A | 10/1989 | Hill | |
| 4,887,260 A | 12/1989 | Carden et al. | |
| 4,913,150 A | 4/1990 | Cheung et al. | |
| 4,916,444 A | 4/1990 | King | |
| 4,920,339 A | 4/1990 | Friend et al. | |
| 4,942,877 A | 7/1990 | Sakai et al. | |
| 4,960,128 A | 10/1990 | Gordon et al. | |
| 4,964,408 A | 10/1990 | Hink et al. | |
| 4,974,591 A | 12/1990 | Awazu et al. | |
| 5,038,800 A | 8/1991 | Oba | |
| 5,041,187 A | 8/1991 | Hink et al. | |
| 5,058,588 A | 10/1991 | Kaestle | |
| 5,061,916 A | 10/1991 | French et al. | |
| 5,069,213 A | 12/1991 | Polczynski | |
| 5,090,410 A | 2/1992 | Saper et al. | |
| 5,113,862 A | 5/1992 | Mortazavi | |
| 5,126,648 A | 6/1992 | Jacobs | |
| 5,140,228 A | 8/1992 | Biegel | |
| 5,158,323 A | 10/1992 | Yamamoto et al. | |
| 5,163,438 A | 11/1992 | Gordon et al. | |
| 5,170,786 A | 12/1992 | Thomas et al. | |
| 5,209,230 A | 5/1993 | Swedlow et al. | |
| 5,246,003 A | 9/1993 | DeLonzor | |
| 5,249,576 A | 10/1993 | Goldberger et al. | |
| 5,267,562 A | 12/1993 | Ukawa et al. | |
| 5,287,853 A | 2/1994 | Vester et al. | |
| 5,308,919 A | 5/1994 | Minnich | |
| 5,319,363 A | 6/1994 | Welch et al. | |
| 5,337,744 A | 8/1994 | Branigan | |
| 5,341,805 A | 8/1994 | Stavridi et al. | |
| D353,195 S | 12/1994 | Savage et al. | |
| D353,196 S | 12/1994 | Savage et al. | |
| 5,377,676 A | 1/1995 | Vari et al. | |
| 5,397,247 A | 3/1995 | Aoki et al. | |
| D359,546 S | 6/1995 | Savage et al. | |
| 5,431,170 A | 7/1995 | Mathews | |
| D361,840 S | 8/1995 | Savage et al. | |
| D362,063 S | 9/1995 | Savage et al. | |
| 5,452,717 A | 9/1995 | Branigan et al. | |
| D363,120 S | 10/1995 | Savage et al. | |
| 5,456,252 A | 10/1995 | Vari et al. | |
| 5,460,182 A | 10/1995 | Goodman et al. | |
| 5,482,036 A | 1/1996 | Diab et al. | |
| 5,490,505 A | 2/1996 | Diab et al. | |
| 5,494,043 A | 2/1996 | O'Sullivan et al. | |
| 5,515,169 A | 5/1996 | Cargill et al. | |
| 5,533,511 A | 7/1996 | Kaspari et al. | |
| 5,561,275 A | 10/1996 | Savage et al. | |
| 5,562,002 A | 10/1996 | Lalin | |
| 5,579,001 A | 11/1996 | Dempsey et al. | |
| 5,579,775 A | 12/1996 | Dempsey et al. | |
| 5,590,649 A | 1/1997 | Caro et al. | |
| 5,602,924 A | 2/1997 | Durand et al. | |
| 5,632,272 A | 5/1997 | Diab et al. | |
| 5,638,816 A | 6/1997 | Kiani-Azarbayjany et al. | |
| 5,638,818 A | 6/1997 | Diab et al. | |
| 5,645,440 A | 7/1997 | Tobler et al. | |
| 5,660,567 A | 8/1997 | Nirlich et al. | |
| 5,673,693 A | 10/1997 | Solenberger | |
| 5,678,544 A | 10/1997 | DeLonzor et al. | |
| 5,682,803 A | 11/1997 | Boianjiu | |
| 5,685,299 A | 11/1997 | Diab et al. | |
| 5,687,734 A * | 11/1997 | Dempsey et al. | 600/509 |
| 5,720,293 A | 2/1998 | Quinn et al. | |
| D393,830 S | 4/1998 | Tobler et al. | |
| 5,743,262 A | 4/1998 | Lepper, Jr. et al. | |
| 5,748,103 A | 5/1998 | Flach et al. | |
| 5,758,644 A | 6/1998 | Diab et al. | |
| 5,760,910 A | 6/1998 | Lepper, Jr. et al. | |
| 5,767,791 A | 6/1998 | Stoop et al. | |
| 5,769,785 A | 6/1998 | Diab et al. | |
| 5,779,630 A | 7/1998 | Fein et al. | |
| 5,782,757 A | 7/1998 | Diab et al. | |
| 5,785,659 A | 7/1998 | Caro et al. | |
| 5,791,347 A | 8/1998 | Flaherty et al. | |
| 5,810,734 A | 9/1998 | Caro et al. | |
| 5,823,950 A | 10/1998 | Diab et al. | |
| 5,830,131 A | 11/1998 | Caro et al. | |
| 5,833,618 A | 11/1998 | Caro et al. | |
| 5,841,435 A * | 11/1998 | Dauerer et al. | 715/775 |
| 5,860,919 A | 1/1999 | Kiani-Azarbayjany et al. | |
| 5,890,929 A | 4/1999 | Mills et al. | |
| 5,904,654 A | 5/1999 | Wohltmann et al. | |
| 5,919,133 A | 7/1999 | Taylor | |
| 5,919,134 A | 7/1999 | Diab | |
| 5,934,925 A | 8/1999 | Tobler et al. | |
| 5,940,182 A | 8/1999 | Lepper, Jr. et al. | |
| 5,987,343 A | 11/1999 | Kinast | |
| 5,995,855 A | 11/1999 | Kiani et al. | |
| 5,997,343 A | 12/1999 | Mills et al. | |
| 5,999,834 A | 12/1999 | Wang et al. | |
| 6,002,952 A | 12/1999 | Diab et al. | |
| 6,011,986 A | 1/2000 | Diab et al. | |
| 6,014,576 A | 1/2000 | Raley | |
| 6,027,452 A | 2/2000 | Flaherty et al. | |
| 6,036,642 A | 3/2000 | Diab et al. | |
| 6,045,509 A | 4/2000 | Caro et al. | |
| 6,061,584 A | 5/2000 | Lovejoy et al. | |
| 6,067,462 A | 5/2000 | Diab et al. | |
| 6,074,345 A | 6/2000 | van Oostrom et al. | |
| 6,081,735 A | 6/2000 | Diab et al. | |
| 6,088,607 A | 7/2000 | Diab et al. | |
| 6,110,522 A | 8/2000 | Lepper, Jr. et al. | |
| 6,124,597 A | 9/2000 | Shehada | |
| 6,144,868 A | 11/2000 | Parker | |
| 6,151,516 A | 11/2000 | Kiani-Azarbayjany et al. | |
| 6,152,754 A | 11/2000 | Gerhardt et al. | |
| 6,157,850 A | 12/2000 | Diab et al. | |
| 6,165,005 A | 12/2000 | Mills et al. | |
| 6,184,521 B1 | 2/2001 | Coffin, IV et al. | |
| 6,206,830 B1 | 3/2001 | Diab et al. | |
| 6,229,856 B1 | 5/2001 | Diab et al. | |
| 6,232,609 B1 | 5/2001 | Snyder et al. | |
| 6,236,872 B1 | 5/2001 | Diab et al. | |
| 6,241,683 B1 | 6/2001 | Macklem et al. | |
| 6,256,523 B1 | 7/2001 | Diab et al. | |
| 6,263,222 B1 | 7/2001 | Diab et al. | |
| 6,278,522 B1 | 8/2001 | Lepper, Jr. et al. | |
| 6,280,213 B1 | 8/2001 | Tobler et al. | |
| 6,285,896 B1 | 9/2001 | Tobler et al. | |
| 6,308,089 B1 | 10/2001 | Von der Ruhr et al. | |
| 6,321,100 B1 | 11/2001 | Parker | |
| 6,334,065 B1 | 12/2001 | Al-Ali et al. | |
| 6,343,224 B1 | 1/2002 | Parker | |
| 6,349,228 B1 | 2/2002 | Kiani et al. | |
| 6,360,114 B1 | 3/2002 | Diab et al. | |
| 6,368,283 B1 | 4/2002 | Xu et al. | |
| 6,371,921 B1 | 4/2002 | Caro et al. | |
| 6,377,829 B1 | 4/2002 | Al-Ali | |
| 6,388,240 B2 | 5/2002 | Schulz et al. | |
| 6,397,091 B2 | 5/2002 | Diab et al. | |
| 6,430,525 B1 | 8/2002 | Weber et al. | |
| 6,440,067 B1 | 8/2002 | DeLuca et al. | |
| 6,463,311 B1 | 10/2002 | Diab | |
| 6,470,199 B1 | 10/2002 | Kopotic et al. | |
| 6,501,975 B2 | 12/2002 | Diab et al. | |
| 6,505,059 B1 | 1/2003 | Kollias et al. | |
| 6,515,273 B2 | 2/2003 | Al-Ali | |
| 6,519,487 B1 | 2/2003 | Parker | |
| 6,525,386 B1 | 2/2003 | Mills et al. | |
| 6,526,300 B1 | 2/2003 | Kiani et al. | |
| 6,541,756 B2 | 4/2003 | Schulz et al. | |
| 6,542,764 B1 | 4/2003 | Al-Ali et al. | |
| 6,544,173 B2 | 4/2003 | West et al. | |
| 6,544,174 B2 | 4/2003 | West et al. | |
| 6,571,113 B1 | 5/2003 | Fein et al. | |
| 6,580,086 B1 | 6/2003 | Schulz et al. | |
| 6,584,336 B1 | 6/2003 | Ali et al. | |
| 6,595,316 B2 | 7/2003 | Cybulski et al. | |
| 6,597,932 B2 | 7/2003 | Tian et al. | |
| 6,597,933 B2 | 7/2003 | Kiani et al. | |
| 6,600,940 B1 | 7/2003 | Fein et al. | |
| 6,606,511 B1 | 8/2003 | Ali et al. | |
| 6,632,181 B2 | 10/2003 | Flaherty et al. | |

| | | |
|---|---|---|
| 6,639,668 B1 | 10/2003 | Trepagnier |
| 6,640,116 B2 | 10/2003 | Diab |
| 6,643,530 B2 | 11/2003 | Diab et al. |
| 6,650,917 B2 | 11/2003 | Diab et al. |
| 6,654,624 B2 | 11/2003 | Diab et al. |
| 6,658,276 B2 | 12/2003 | Kianl et al. |
| 6,661,161 B1 | 12/2003 | Lanzo et al. |
| 6,671,531 B2 | 12/2003 | Al-Ali et al. |
| 6,678,543 B2 | 1/2004 | Diab et al. |
| 6,684,090 B2 | 1/2004 | Ali et al. |
| 6,684,091 B2 | 1/2004 | Parker |
| 6,697,656 B1 | 2/2004 | Al-Ali |
| 6,697,657 B1 | 2/2004 | Shehada et al. |
| 6,697,658 B2 | 2/2004 | Al-Ali |
| RE38,476 E | 3/2004 | Diab et al. |
| 6,699,194 B1 | 3/2004 | Diab et al. |
| 6,714,804 B2 | 3/2004 | Al-Ali et al. |
| RE38,492 E | 4/2004 | Diab et al. |
| 6,721,582 B2 | 4/2004 | Trepagnier et al. |
| 6,721,585 B1 | 4/2004 | Parker |
| 6,725,075 B2 | 4/2004 | Al-Ali |
| 6,728,560 B2 | 4/2004 | Kollias et al. |
| 6,728,561 B2 | 4/2004 | Smith et al. |
| 6,735,459 B2 | 5/2004 | Parker |
| 6,745,060 B2 | 6/2004 | Diab et al. |
| 6,760,607 B2 | 7/2004 | Al-All |
| 6,770,028 B1 | 8/2004 | Ali et al. |
| 6,771,994 B2 | 8/2004 | Kiani et al. |
| 6,790,178 B1 | 9/2004 | Mault et al. |
| 6,792,300 B1 | 9/2004 | Diab et al. |
| 6,813,511 B2 | 11/2004 | Diab et al. |
| 6,816,741 B2 | 11/2004 | Diab |
| 6,822,564 B2 | 11/2004 | Al-Ali |
| 6,826,419 B2 | 11/2004 | Diab et al. |
| 6,830,711 B2 | 12/2004 | Mills et al. |
| 6,850,787 B2 | 2/2005 | Weber et al. |
| 6,850,788 B2 | 2/2005 | Al-Ali |
| 6,852,083 B2 | 2/2005 | Caro et al. |
| 6,861,639 B2 | 3/2005 | Al-Ali |
| 6,898,452 B2 | 5/2005 | Al-Ali et al. |
| 6,920,345 B2 | 7/2005 | Al-Ali et al. |
| 6,928,370 B2 | 8/2005 | Anuzis et al. |
| 6,931,268 B1 | 8/2005 | Kiani-Azarbayjany et al. |
| 6,934,570 B2 | 8/2005 | Kiani et al. |
| 6,939,305 B2 | 9/2005 | Flaherty et al. |
| 6,943,348 B1 | 9/2005 | Coffin, IV |
| 6,950,687 B2 | 9/2005 | Al-Ali |
| 6,961,598 B2 | 11/2005 | Diab |
| 6,970,792 B1 | 11/2005 | Diab |
| 6,979,812 B2 | 12/2005 | Al-Ali |
| 6,985,764 B2 | 1/2006 | Mason et al. |
| 6,993,371 B2 | 1/2006 | Kiani et al. |
| 6,996,427 B2 | 2/2006 | Ali et al. |
| 6,999,904 B2 | 2/2006 | Weber et al. |
| 7,003,338 B2 | 2/2006 | Weber et al. |
| 7,003,339 B2 | 2/2006 | Diab et al. |
| 7,015,451 B2 | 3/2006 | Dalke et al. |
| 7,024,233 B2 | 4/2006 | Al et al. |
| 7,027,849 B2 | 4/2006 | Al-Ali |
| 7,030,749 B2 | 4/2006 | Al-Ali |
| 7,039,449 B2 | 5/2006 | Al-Ali |
| 7,041,060 B2 | 5/2006 | Flaherty et al. |
| 7,044,918 B2 | 5/2006 | Diab |
| 7,067,893 B2 | 6/2006 | Mills et al. |
| 7,096,052 B2 | 8/2006 | Mason et al. |
| 7,096,054 B2 | 8/2006 | Abdul-Hafiz et al. |
| 7,132,641 B2 | 11/2006 | Schulz et al. |
| 7,142,901 B2 | 11/2006 | Kiani et al. |
| 7,149,561 B2 | 12/2006 | Diab |
| 7,186,966 B2 | 3/2007 | Al-Ali |
| 7,190,261 B2 | 3/2007 | Al-Ali |
| 7,215,984 B2 | 5/2007 | Diab |
| 7,215,986 B2 | 5/2007 | Diab |
| 7,221,971 B2 | 5/2007 | Diab |
| 7,225,006 B2 | 5/2007 | Al-Ali et al. |
| 7,225,007 B2 | 5/2007 | Al-Ali |
| RE39,672 E | 6/2007 | Shehada et al. |
| 7,239,905 B2 | 7/2007 | Kiani-Azarbayjany et al. |
| 7,245,953 B1 | 7/2007 | Parker |
| 7,254,431 B2 | 8/2007 | Al-Ali |
| 7,254,433 B2 | 8/2007 | Diab et al. |
| 7,254,434 B2 | 8/2007 | Schulz et al. |
| 7,272,425 B2 | 9/2007 | Al-Ali |
| 7,274,955 B2 | 9/2007 | Kiani et al. |
| D554,263 S | 10/2007 | Al-Ali |
| 7,280,858 B2 | 10/2007 | Al-Ali et al. |
| 7,289,835 B2 | 10/2007 | Mansfield et al. |
| 7,292,883 B2 | 11/2007 | De Felice et al. |
| 7,295,866 B2 | 11/2007 | Al-Ali |
| 7,328,053 B1 | 2/2008 | Diab et al. |
| 7,332,784 B2 | 2/2008 | Mills et al. |
| 7,340,287 B2 | 3/2008 | Mason et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,355,512 B1 | 4/2008 | Al-Ali |
| 7,371,981 B2 | 5/2008 | Abdul-Hafiz |
| 7,373,193 B2 | 5/2008 | Al-Ali et al. |
| 7,373,194 B2 | 5/2008 | Weber et al. |
| 7,376,453 B1 | 5/2008 | Diab et al. |
| 7,377,794 B2 | 5/2008 | Al-Ali et al. |
| 7,377,899 B2 | 5/2008 | Weber et al. |
| 7,383,070 B2 | 6/2008 | Diab et al. |
| 2002/0007198 A1 | 1/2002 | Haupert et al. |
| 2002/0062070 A1 | 5/2002 | Tschupp et al. |
| 2002/0072880 A1* | 6/2002 | Svanerudh et al. ........... 702/189 |
| 2003/0088165 A1 | 5/2003 | Smith et al. |
| 2004/0204635 A1* | 10/2004 | Scharf et al. .................. 600/323 |
| 2004/0260154 A1 | 12/2004 | Sidelnik et al. |
| 2005/0058486 A1* | 3/2005 | Yamanaka ...................... 400/76 |
| 2005/0075548 A1 | 4/2005 | Al-Ali et al. |
| 2005/0206518 A1 | 9/2005 | Welch et al. |
| 2006/0155576 A1* | 7/2006 | Deluz ................................ 705/2 |
| 2006/0238333 A1 | 10/2006 | Welch et al. |
| 2008/0033267 A1 | 2/2008 | Al-Ali et al. |

FOREIGN PATENT DOCUMENTS

| | | |
|---|---|---|
| EP | 0 019 478 A2 | 11/1980 |
| EP | 0 313 238 A2 | 4/1989 |
| EP | 0 104 772 B1 | 3/1990 |
| EP | 0640978 | 3/1995 |
| EP | 1 281 353 A1 | 2/2003 |
| JP | 05275746 A | 10/1993 |
| JP | 06237013 | 8/1994 |
| WO | WO 88/10462 | 12/1988 |
| WO | WO 01/41634 A2 | 6/2001 |
| WO | WO 0215781 | 2/2002 |
| WO | WO 2004/060155 | 7/2004 |
| WO | WO 2005/040793 | 5/2005 |
| WO | WO 2006/023721 | 3/2006 |

OTHER PUBLICATIONS

Masimo Corporation, "Discrete Saturation Transforms Example", reviewed on Sep. 17, 1999.

Medical Strategic Planning, Inc., MSP Industry Alert, "Masimo to Introduce NR7 At ASA," pp. 18, 19, and the front and back cover, vol. 3, No. 3, Fall 2001.

PCT International Search Report, App. No. PCT/US2004/023862, App. Date Jul. 26, 2004, 4 pages.

PCT International Search Report, App. No. PCT/US2000/042637, App. Date: Jul. 12, 2000, 5 pages.

PCT International Search Report, App. No. PCT/US2002/022712, App. Date: Jul. 17, 2002, 4 pages.

Reynolds, K.J., et al., "Temperature Dependence of LED and its Theoretical Effect on Pulse Oximetry", British Journal & Anaesthesia, 1991, vol. 67, pp. 638-643.

The International Search Report of PCT/EP2004/007042, mailed Sep. 23, 2004.

The International Search Report of PCT/US2007/070362 mailed Sep. 7, 2009.

The Written Opinion of the International Searching Authority of PCT/US2007/070362, mailed Sep. 9, 2009.

* cited by examiner

VIRTUAL DISPLAY

PRIORITY CLAIM TO RELATED PROVISIONAL APPLICATIONS

The present application claims priority benefit under 35 U.S.C. §119(e) to U.S. Provisional Patent Application Ser. No. 60/755,899, filed Jan. 3, 2006, entitled "Virtual Display." The present application incorporates the foregoing disclosure herein by reference.

BACKGROUND OF THE INVENTION

A conventional multiple parameter measurement system (MPMS) has a parameter processor and a host processor. The parameter processor may be an OEM board or plug-in that connects to and drives a sensor and computes one or more physiological parameters from the resulting sensor signal. The host processor communicates with the parameter processor so as to receive and display these parameters. As examples, a MPMS may display arterial oxygen saturation (SpO2), pulse rate, ECG waveforms, blood pressure and body temperature, to name a few.

SUMMARY OF THE INVENTION

A conventional MPMS typically requires hardware or software modifications in order to measure and display a new and useful parameter, such as a physiological measurement resulting from a technological advance. A virtual display advantageously generates a display for a previously undefined, unmeasurable or unknown measurement without complex system modifications. In one embodiment, a virtual display can be flexibly characterized so that a MPMS that is upgraded to measure a new parameter can readily display that parameter.

One aspect of a virtual display defines display objects capable of visually indicating physiological measurements and physiological monitor status. A subset of the display objects corresponding to a physiological parameter is selected. The selected display objects are organized within a virtual display area corresponding to at least a portion of a physical display. Data objects corresponding to the physiological parameter are associated with the selected display objects.

Another aspect of a virtual display is a physiological parameter measurement system comprising a virtual display, a parameter processor and a host processor. The parameter processor is adapted to input a sensor signal and output a physiological parameter responsive to the sensor signal. The host processor is in communication with said parameter processor, and the virtual display resides in the host processor. The parameter processor has a characterization for the virtual display that corresponds to the physiological parameter. That characterization is communicated to the host processor so as to enable the host processor to display the physiological parameter.

A further aspect of a virtual display comprises a virtual display area, a display object, a display layout and a data setup. The virtual display area corresponds to at least a portion of a physical display. The display objects are allocated to the display area. A display layout specifies at least the size and location of the display objects within the virtual display area, and a data setup associates the data objects with the display objects. The display objects are selected to visually indicate measurements of one or more particular physiological parameters on the physical display. The data objects identify measurements of the physiological parameters and information associated with the measurements.

DETAILED DESCRIPTION OF THE PREFERRED EMBODIMENTS

Figure 1:
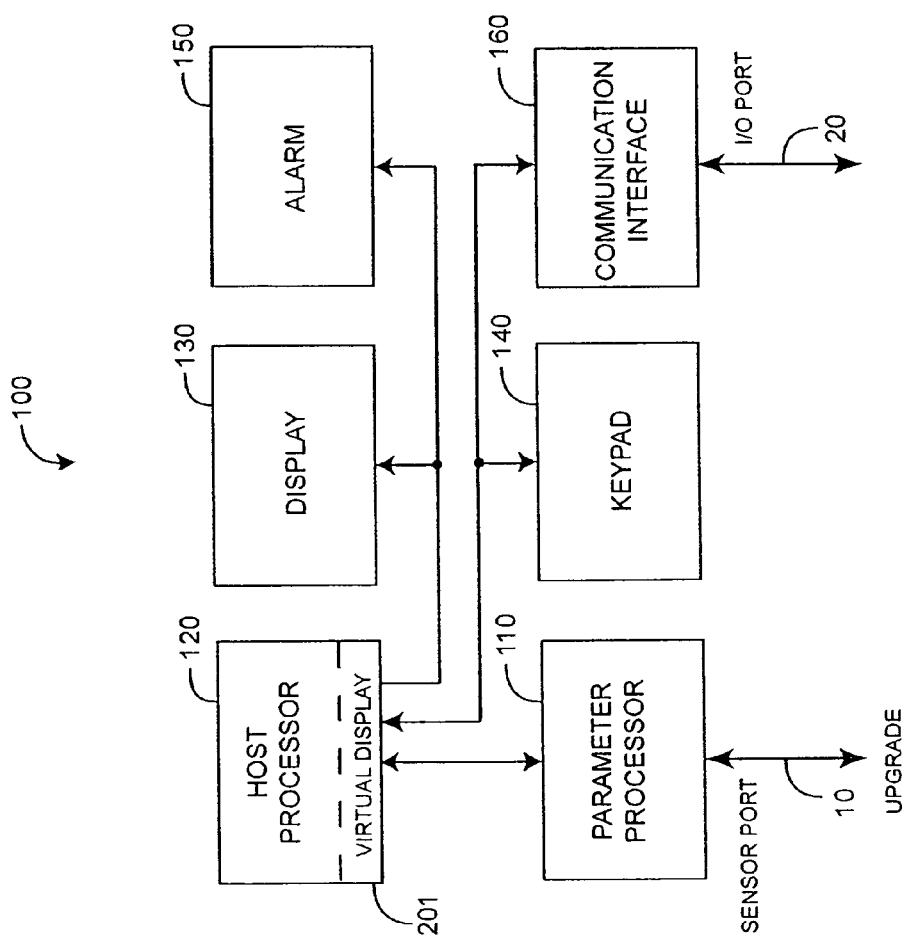
FIG. 1 is a block diagram of a multi-parameter measurement system (MPMS) incorporating a virtual display.

FIG. 1 illustrates a multi-parameter measurement system 100 (MPMS) configured with a virtual display. The MPMS comprises a parameter processor 110 and associated sensor port 10, a host processor 120 and a display 130. The parameter processor 110 is configured to receive signal processing and sensor control upgrades so that the parameter processor 110 is able to interface with new or upgraded sensors and able to measure previously undefined, unmeasurable or unknown, i.e. "new" physiological parameters. In one embodiment, the MPMS 100 is upgraded via the sensor port 10. A sensor port upgrade capability is described in U.S. Pat. Pub. No. 2005/0075548, entitled Multipurpose Sensor Port, assigned to Masimo Corporation, Irvine, Calif. and incorporated by reference herein. In another embodiment, the parameter processor 110 is a plug-in containing a new parameter measurement capability that is inserted into the MPMS 100.

As shown in FIG. 1, the MPMS 100 advantageously incorporates a virtual display 201 that enables the MPMS 100 to readily display a new physiological parameter. In particular, the virtual display 201 resides on the host processor 120. A parameter upgrade loaded into the parameter processor 110 provides information in a predetermined format that characterizes the virtual display 201, i.e. describes how the MPMS 100 should display a new physiological parameter. The MPMS 100 may also have a keypad 140, an alarm 150, communications 160 and an associated I/O port 20 that provide status to the virtual display 201 according to the parameter upgrade. A virtual display 201 is described in detail with respect to FIG. 2, below.

Figure 2:
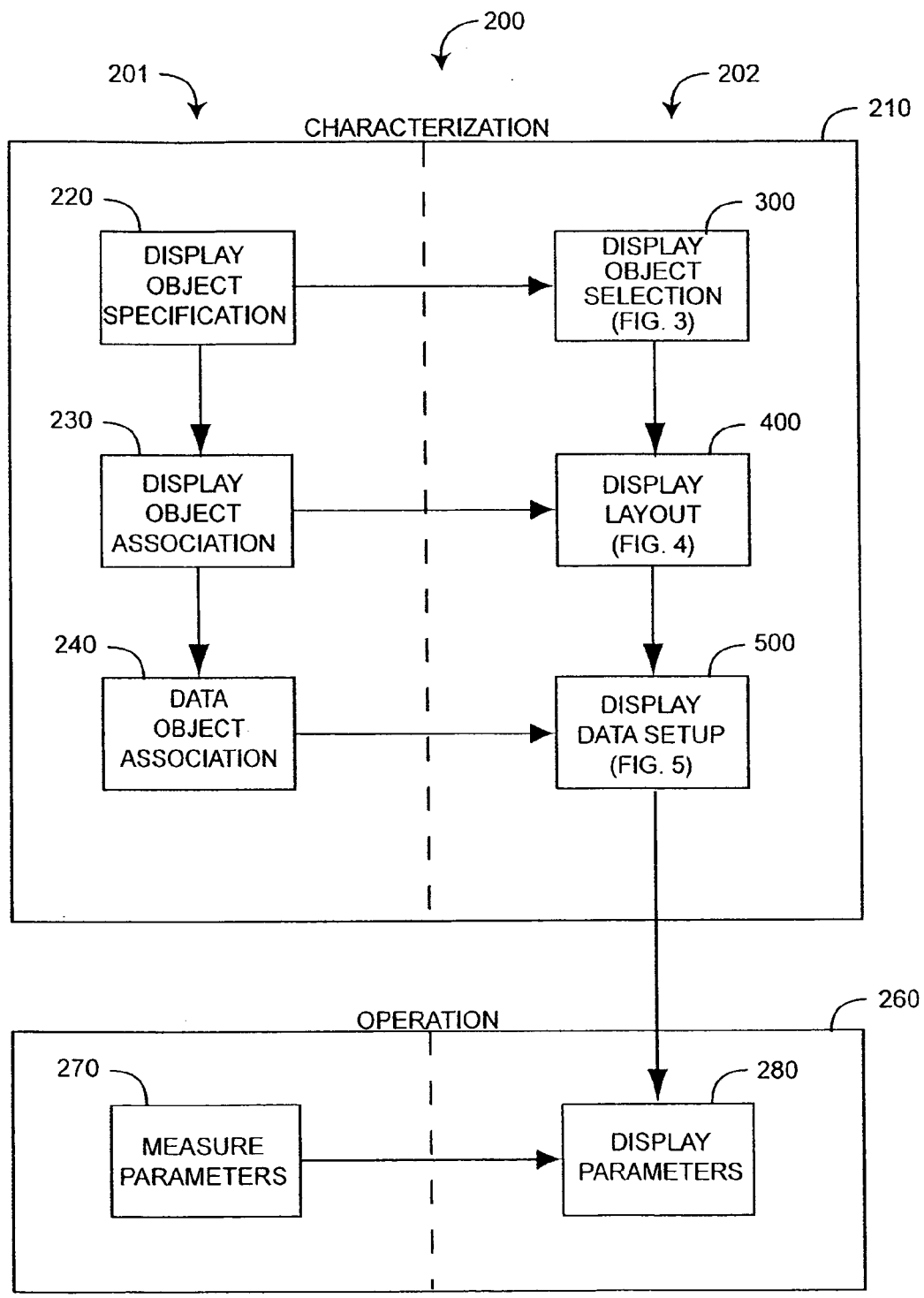
FIG. 2 is a flow diagram for a virtual display.

FIG. 2 illustrates virtual display functions 200, which are divided between parameter processor functions 201 and host processor functions 202 and also between characterization functions 210 and operation functions 260. During characterization 210, the parameter processor 110 (FIG. 1) prepares the host processor 120 (FIG. 1) to display one or more new parameters. During operation 260, the parameter processor 110 (FIG. 1) provides the new parameter or parameters to the host processor 120 (FIG. 1) for display according to the prior characterization. In one embodiment, the virtual display characterization 210 determines how data is to be displayed, such as a waveform, a bar graph or a numeric readout; how the display is organized, such as the size and layout of readouts and labels on a physical display space; and which data goes where on the display. Then, during operation 260, the parameter processor provides measurement data for the virtual display 201, and the host processor 120 (FIG. 1) communicates the virtual display 201 to the physical display 130.

As shown in FIG. 2, characterization 210 includes the parameter processor functions 201 of display object specification 220, display object association 230 and data object association 240. Display objects are display mechanisms or formats used to present parameter measurements and processor status on a display 130 (FIG. 1). Display objects may include, for example, various graphs, alphanumeric readouts and visual indicators. The display object specification 220 informs the host instrument which of various predefined display objects will be used to display one or more new parameters and corresponding monitor status.

The display object association 230 informs the host instrument of a desired organizational schema for the display objects, i.e. the spatial relationships and any other correspondence between the various display objects on the display. For instance, the host processor may need to locate an alphanumeric object immediately adjacent to a graphical object in order to display a waveform and a corresponding label identifying the waveform.

The data object association 240 informs the host instrument of the various data types, how those data types are to be recognized by the host instrument, and which data types are associated with which previously specified display objects. For example, plethysmograph data output from the parameter processor may map to a specific graphical display object.

Further shown in FIG. 2, characterization 210 also includes the host processor functions 202 of display object selection 300, display layout 400 and display data setup 500, which correspond to the parameter processor functions 201 described above. Display object selection 300 is a response to display object specification 220. In particular, the host processor selects one or more predefined display objects that the display object specification 220 identifies for use in a newly configured display.

Figure 3:
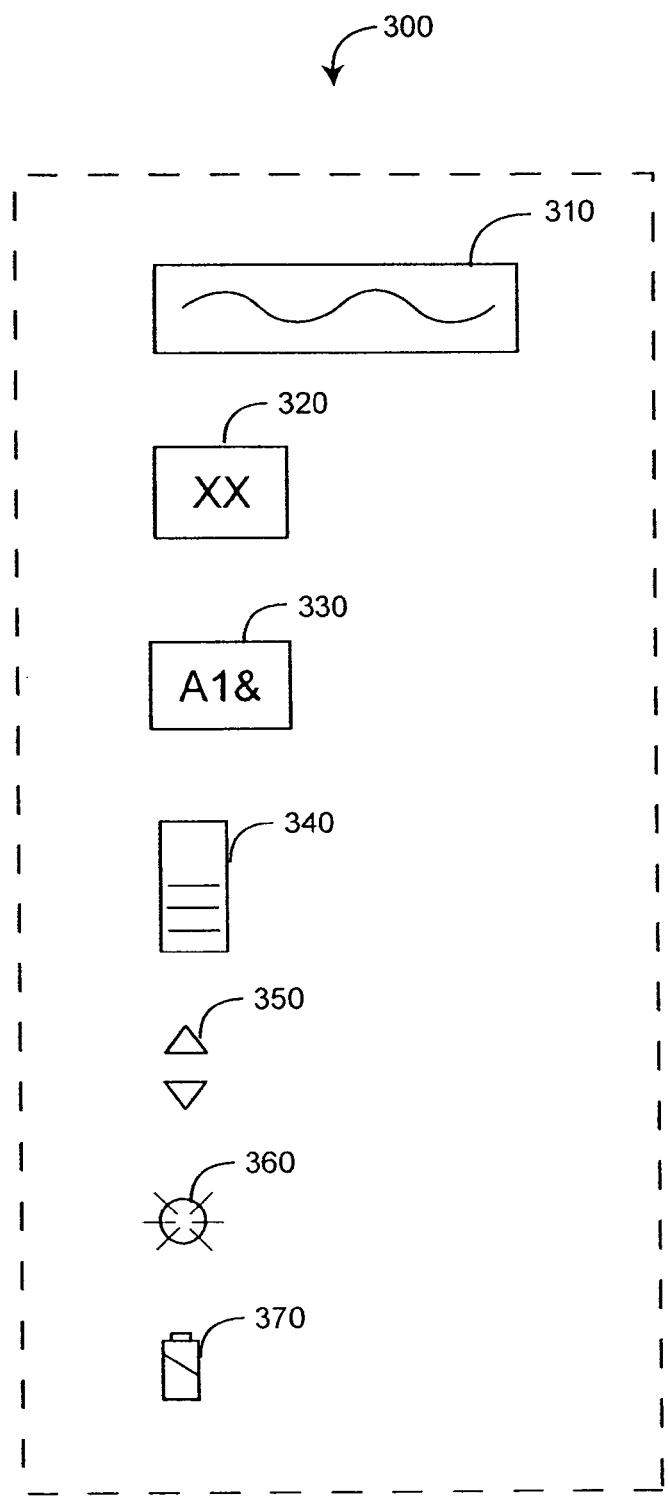
FIG. 3 is an illustration of exemplar display objects.

FIG. 3 illustrates various display objects 300 including, as examples, a waveform magnitude vs. time graph 310, a numeric readout 320, an alphanumeric label 330, a bar graph 340, trend indicators 350, a visual alarm 360 and a battery charge indicator 370. One of ordinary skill in the art will recognize many other possible display objects useful for visually indicating, for example, physiological measurements and monitor status.

As shown in FIG. 2, display layout 400 is a host processor response to display object association 230. In particular, the host processor organizes selected display objects, such as described with respect to FIG. 3, above, within a virtual display area. The virtual display area may correspond to an entire physical display or a newly allocated portion of a physical display utilized for simultaneous monitoring of multiple physiological parameters. In particular, the host processor utilizes known characteristics of the selected display objects along with the organizational schema provided by the display object association 230 to generate a layout for a newly defined display.

Figure 4:
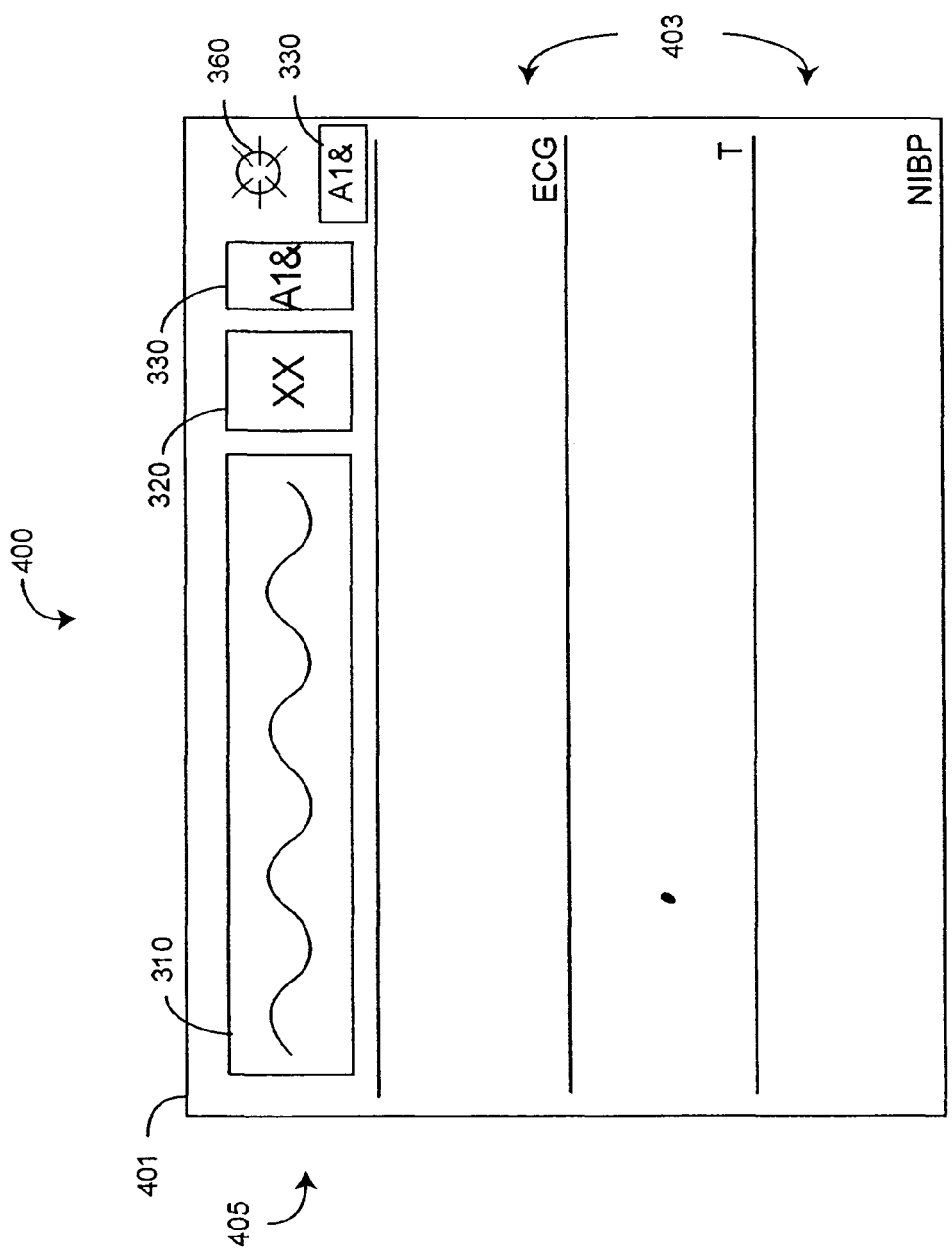
FIG. 4 is an illustration of an exemplar display layout utilizing selected display objects.

FIG. 4 illustrates an example of a display layout 400 having a virtual display area 401, a first display area portion 403 allocated for previously defined parameters, such as ECG, temperature (T) and noninvasive blood pressure (NIBP) in this example, and a second display area portion 405 allocated for newly defined parameters. The display layout 400 locates and organizes selected display objects 300 (FIG. 3) including a waveform graph object 310, a numeric readout object 320, two label objects 330 and an visual alarm object 360 within the second display portion 405. In particular, the display layout 400 responds to the display object association 230 constraints that a first label 330 is adjacent and to the right of the numeric readout 320 and a second label 330 is adjacent and below the visual alarm 360. Other constraints may include the relative size and location of the waveform object 310. The functionality of the resulting display layout 400 is described further with respect to FIG. 5, below.

Additionally shown in FIG. 2, display data setup 500 is a response to data object association 240. In particular, the host processor associates parameter processor identified input data with particular display objects located within the allocated display area 403 (FIG. 4). Input data may be identified according to a physical input port or a data header or similar code within a data stream, or both.

Figure 5:
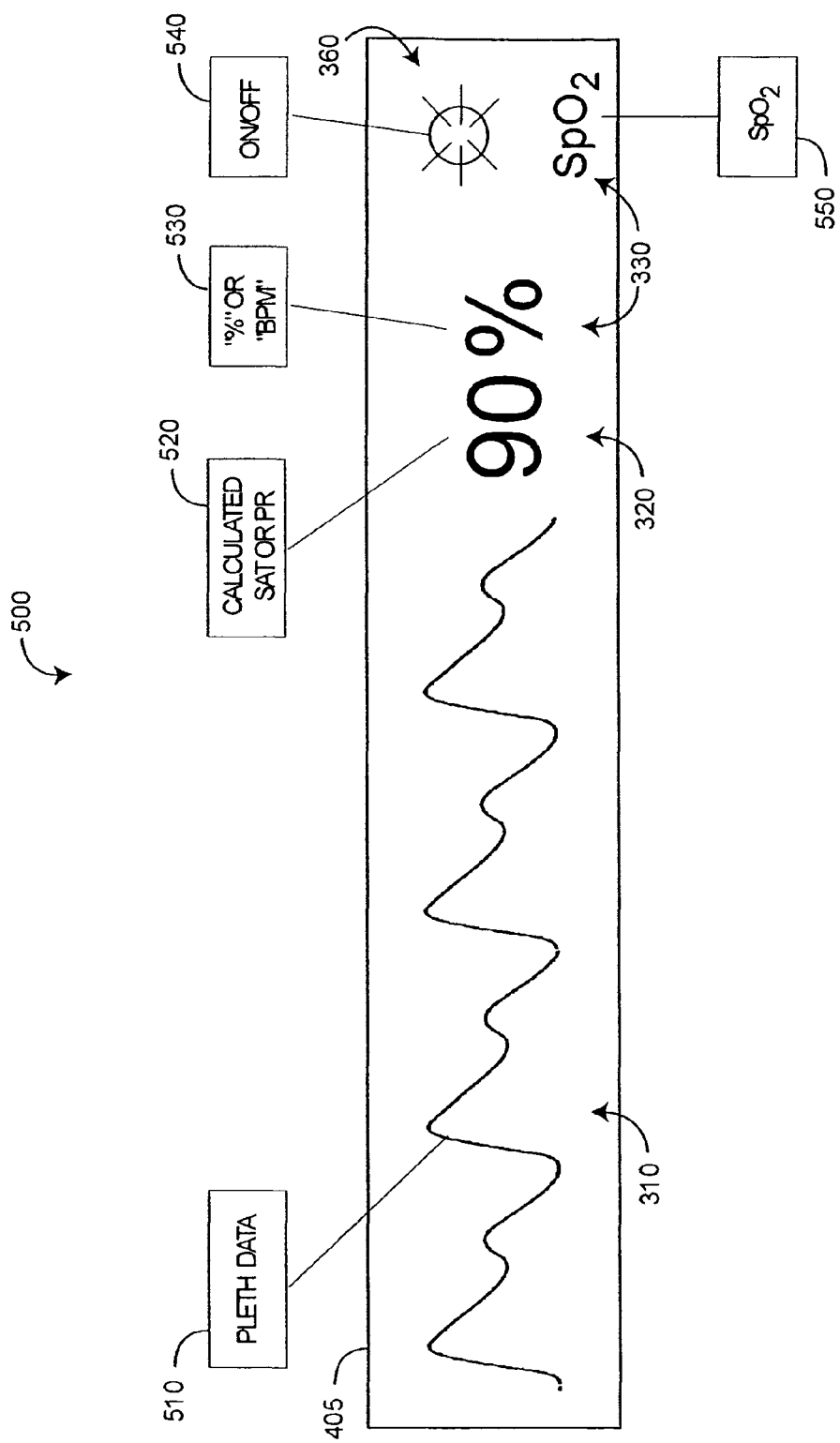
FIG. 5 is an illustration of an exemplar display data setup.

FIG. 5 illustrates one example of a display data setup 500 having various data objects 510-550 associated with various display objects 310-360 within a display area 405, so as to form an operational virtual display 201 (FIG. 1). During operation, data comprising measured parameters from the parameter processor and possibly status or other data from the parameter processor 110 (FIG. 1), host processor 120 (FIG. 1), keypad 140 (FIG. 1) or communication interface 160 (FIG. 1) is transferred to the display objects 310-360 of the virtual display 201 (FIG. 1). The virtual display 201 (FIG. 1) is then communicated to the physical display 130 (FIG. 1), as described above. In this particular example, a plethysmograph data object 510 is associated with the waveform object 310; a calculated saturation or pulse rate data object 520 is associated with a numeric readout object 320; a "%" or "BPM" text object 530 is associated with a first label object 330; a "SpO2" text object is associated with a second label object 330 and an on/off command object 540 is associated with a visual alarm object 540. The result is an operational pulse oximetry display.

Although a virtual display is described above with respect to a MPMS having a parameter processor and a host processor, in another embodiment, a physiological measurement system comprises a signal processor that functions as both a parameter processor and a host processor, as described above, with the signal processor incorporating a virtual display. A virtual display has been disclosed in detail in connection with various embodiments. These embodiments are disclosed by way of examples only and are not to limit the scope of the claims that follow. One of ordinary skill in art will appreciate many variations and modifications.

What is claimed is:

1. A display method comprising:
defining a plurality of display objects in a patient monitor configured to visually indicate at least one measurement of at least one physiological parameter, wherein the at least one measurement is determined using sensor signals received via a sensor port;
organizing the plurality of display objects within a virtual display area corresponding to at least a portion of a physical display to create a first display layout;
communicatively coupling a sensor to the sensor port;
receiving a display upgrade object through the sensor port, wherein the display upgrade object is different from the sensor signals;
associating at least one display object from the plurality of display objects with an additional physiological parameter previously undefined by the patient monitor in accordance with the display upgrade object;
organizing the at least one display object within the virtual display area in accordance with the display upgrade object to create a second display layout;
associating a plurality of data objects corresponding to the additional physiological parameter with the at least one display object;
determining whether the sensor is capable of measuring the additional physiological parameter characterized by the display upgrade object; and
upon determining that the sensor is capable of measuring the additional physiological parameter, automatically altering the virtual display based at least in part on the first display layout and the second display layout.

2. The display method according to claim 1, further comprising:
   measuring the first physiological parameter;
   associating the measurements with the data objects so as to generate a virtual display; and
   communicating the virtual display to the physical display.

3. The display method according to claim 2, wherein the defining comprises:
   defining measurement display objects comprising at least one of magnitude versus time graphs, bar graphs, magnitude versus frequency graphs, numerical readouts, alphanumeric labels, trend indicators and visual alarm indicators; and
   defining monitor status display objects comprising at least one of power on/off indicators, low battery indicators, malfunction indicators.

4. The display method according to claim 1, wherein the organizing comprises:
   spatially associating a first portion of the selected display objects with a second portion of the selected display objects within the virtual display area; and
   determining the relative size of the display objects within the virtual display area.

5. The display method according to claim 1, wherein the display upgrade object is received from a personal computer interfaced to the sensor port.

6. The display method according to claim 1, wherein the display upgrade object comprises information associating at least one of the display objects to the physiological parameter.

7. A physiological parameter measurement system comprising:
   a parameter processor configured to receive a sensor signal from a sensor and output at least a measurement of a first physiological parameter responsive to the sensor signal;
   a host processor in communication with the parameter processor;
   a virtual display residing in the host processor; and
   a first characterization for the virtual display residing in the parameter processor, wherein
   the first characterization is communicated to the host processor so as to enable the host processor to display the first physiological parameter,
   the parameter processor is further configured to:
      receive a parameter upgrade through a sensor port enabling the parameter processor to output at least a measurement of a second physiological parameter not previously displayed, wherein the parameter upgrade differs from the sensor signal and comprises a second characterization for the virtual display, and
      determine whether the sensor is capable of measuring the second physiological parameter; and
      upon determining that the sensor is capable of measuring the second physiological parameter, automatically alter the virtual display based at least in part on the first characterization and the second characterization.

8. The physiological parameter measurement system according to claim 7, wherein the virtual display comprises a plurality of display objects and a virtual display area.

9. The physiological parameter measurement system according to claim 8, wherein the first characterization comprises a first display schema for selecting the display objects and organizing the selected display objects within the virtual display area.

10. The physiological parameter measurement system according to claim 9, wherein the first characterization further comprises a mapping schema for associating data objects corresponding to the first physiological parameter with the selected display objects.

11. The physiological parameter measurement system according to claim 10, wherein the display objects comprise numerical readouts, alphanumeric labels, graphs, arrows, visual alarms and status indicators.

12. The physiological parameter measurement system according to claim 11, wherein the data objects identify data types comprising numerical values, alphanumeric values, waveforms, magnitudes, trends and alarms.

13. The physiological parameter measurement system according to claim 8, wherein the parameter upgrade is compiled in the parameter processor.

14. The physiological parameter measurement system according to claim 8, wherein the second characterization comprises a second display schema for selecting the display objects and organizing the selected display objects within the virtual display area.

15. The physiological parameter measurement system according to claim 14, wherein the second characterization further comprises a mapping schema for associating data objects corresponding to the second physiological parameter with the selected display objects.

16. The display method of claim 7, wherein the second physiological parameter is previously unknown by the physiological parameter measurement system.

17. A virtual display comprising:
   a virtual display area corresponding to at least a portion of a physical display;
   a plurality of display objects allocated to the virtual display area;
   a first display layout specifying at least the size and location of the display objects within the virtual display area for a first physiological parameter; and
   a first data setup associating a plurality of data objects with the plurality of display objects for the first physiological parameter, wherein
   at least one display object from the plurality of display objects is selected to visually indicate measurements of the first physiological parameter on the physical display,
   at least one data object from the plurality of data objects identifies the measurements and information corresponding to the measurements,
   a second display layout and a second data setup for a second physiological parameter can be added via a display upgrade object received through a sensor port, wherein the second physiological parameter is unknown to the virtual display prior to receipt of the display upgrade object and the sensor port is further configured to receive sensor signals from a sensor indicative of a physiological parameter different from the display upgrade object, and
   the virtual display is configured to:
      determine whether the sensor is capable of measuring the second physiological parameter; and
      upon determining that the sensor is capable of measuring the second physiological parameter, automatically alter the virtual display area based at least in part on the first display layout and the first data setup and the second display layout and second data setup.

18. The virtual display of claim 17, wherein the display upgrade object comprises at least one of the plurality of display objects selected to visually indicate measurements of a second physiological parameter on the display.

19. A display method comprising:
receiving a parameter upgrade through a sensor port of a multi-parameter measurement system, wherein the multi-parameter measurement system includes a plurality display of objects associated with one or more physiological parameters, the display objects being configured to visually indicate one or more measurements of the one or more physiological parameters according to at least a first display layout;
associating at least one display object from the plurality of display objects with an additional physiological parameter in accordance with the parameter upgrade, the at least one display object being configured to visually indicate at least one measurement of the additional physiological parameter, wherein the measurement is determined using sensor signals received from a sensor via the sensor port;
organizing the at least one display object within a virtual display area corresponding to at least a portion of a physical display of the multi-parameter measurement system in accordance with the parameter upgrade to create a second display layout;
associating at least one data object from a plurality of data objects corresponding to the physiological parameter with the least one display object in accordance with the parameter upgrade;
determining whether the sensor is capable of measuring the additional physiological parameter; and
upon determining that the sensor is capable of measuring the additional physiological parameter, automatically altering the virtual display based at least in part on the first display layout and the second display layout.

20. The display method of claim 19, wherein the physiological parameter is previously unknown by the multi-parameter measurement system.

21. A physiological parameter measurement system comprising:
a sensor port in communication with a digital signal processor and configured to receive sensor signals from a sensor and further configured to receive a parameter upgrade, wherein the digital signal processor is configured to determine at least a measurement of a first physiological parameter using the sensor signals received at the sensor port;
a virtual display comprising a plurality of display objects; and
a first characterization associated with the first physiological parameter, wherein
the virtual display is configured to associate at least at least one of the plurality of display objects with a physical display according to the first characterization
the parameter upgrade comprises a second characterization associated with a second physiological parameter, wherein the virtual display is further configured to associate at least one of the plurality of display objects with the physical display according to the second characterization, and
the digital signal processor is further configured to:
determine whether the sensor is capable of measuring the second physiological parameter; and
upon determining that the sensor is capable of measuring the second physiological parameter, automatically alter the virtual display based at least in part on the first characterization and the second characterization.

22. The display method of claim 21, wherein the second physiological parameter is previously unknown by the physiological parameter measurement system.

* * * * *